(12) United States Patent
Crucs

(10) Patent No.: US 9,076,331 B2
(45) Date of Patent: Jul. 7, 2015

(54) SYSTEM AND METHOD TO MONITOR VEHICLES ON A ROADWAY AND TO CONTROL DRIVING RESTRICTIONS OF VEHICLE DRIVERS

(75) Inventor: Kevin M. Crucs, Copley, OH (US)

(73) Assignee: Crucs Holdings, LLC, Copley, OH (US)

( * ) Notice: Subject to any disclaimer, the term of this patent is extended or adjusted under 35 U.S.C. 154(b) by 2485 days.

(21) Appl. No.: 11/778,129

(22) Filed: Jul. 16, 2007

(65) Prior Publication Data

US 2009/0024309 A1 Jan. 22, 2009

(51) Int. Cl.
*G06F 19/00* (2011.01)
*G08G 1/015* (2006.01)
*G07C 5/08* (2006.01)
*B60R 25/24* (2013.01)
*G07C 9/00* (2006.01)
*G08G 1/017* (2006.01)
*G08G 1/052* (2006.01)

(52) U.S. Cl.
CPC .............. *G08G 1/015* (2013.01); *G07C 5/0841* (2013.01); *B60R 25/241* (2013.01); *G07C 9/00103* (2013.01); *G08G 1/017* (2013.01); *G08G 1/052* (2013.01)

(58) Field of Classification Search
CPC ... G05D 1/028; G05D 1/0282; G05D 1/0287; G08G 1/017; H04L 67/222; B60R 25/241; G07C 5/0841; G07C 9/00103
USPC .......................................... 701/117, 118, 119
See application file for complete search history.

(56) References Cited

U.S. PATENT DOCUMENTS

| 4,633,407 | A | 12/1986 | Freienstein et al. |
|---|---|---|---|
| 5,218,367 | A | 6/1993 | Sheffer et al. |
| 5,223,844 | A | 6/1993 | Mansell et al. |
| 5,602,739 | A | 2/1997 | Haagenstad et al. |
| 5,617,086 | A | 4/1997 | Klashinsky et al. |
| 5,673,305 | A | 9/1997 | Ross |
| 5,878,367 | A | 3/1999 | Lee et al. |
| 5,961,571 | A | 10/1999 | Gorr et al. |
| 5,969,641 | A | 10/1999 | Nakamura et al. |
| 6,098,048 | A | 8/2000 | Dashefsky et al. |
| 6,240,365 | B1 | 5/2001 | Bunn |

(Continued)

OTHER PUBLICATIONS

PCTUS2008070037 International Search Report.

(Continued)

*Primary Examiner* — Thomas G Black
*Assistant Examiner* — Sze-Hon Kong
(74) *Attorney, Agent, or Firm* — Hahn Loeser & Parks LLP; Brendan E. Clark

(57) ABSTRACT

A system and method for tracking and monitoring vehicles on a roadway. RFID tags are positioned along the roadway and may be interrogated by vehicles equipped with an RFID scanner and a transceiver as the vehicles encounter the RFID tags along the roadway. The RFID tag information received by the RFID scanner is transmitted by the transceiver to a roadside repeater station which in turn sends the RFID tag information, as well as other identifying information, to a remote central tracking station. The remote central tracking station processes the RFID tag information and other information to determine a current position of a corresponding vehicle. Driver ranking profiles may be generated for drivers of vehicles and stored in a database in the central tracking station. The driver ranking profiles are used to restrict drivers in certain ways.

52 Claims, 10 Drawing Sheets

(56) References Cited

U.S. PATENT DOCUMENTS

| | | | |
|---|---|---|---|
| 6,345,228 B1 | 2/2002 | Lees | |
| 6,363,323 B1 | 3/2002 | Jones | |
| 6,392,565 B1 | 5/2002 | Brown | |
| 6,480,783 B1 | 11/2002 | Myr | |
| 6,512,465 B2 | 1/2003 | Flick | |
| 6,606,562 B1 | 8/2003 | Gifford | |
| 6,631,322 B1 | 10/2003 | Arthur et al. | |
| 6,737,989 B2 | 5/2004 | Flick | |
| 6,756,887 B2 | 6/2004 | Evans | |
| 6,807,481 B1* | 10/2004 | Gastelum | 701/209 |
| 6,833,811 B2 | 12/2004 | Zeitfuss et al. | |
| 6,853,910 B1 | 2/2005 | Oesterling et al. | |
| 6,904,347 B1 | 6/2005 | Berenz et al. | |
| 6,908,066 B2 | 6/2005 | Koenig | |
| 6,988,026 B2 | 1/2006 | Breed et al. | |
| 7,082,359 B2 | 7/2006 | Breed | |
| 7,421,334 B2* | 9/2008 | Dahlgren et al. | 701/117 |
| 7,554,441 B2* | 6/2009 | Viegers et al. | 340/539.22 |
| 7,634,226 B2* | 12/2009 | Estevez | 455/3.05 |
| 7,692,552 B2* | 4/2010 | Harrington et al. | 340/576 |
| 7,750,841 B2* | 7/2010 | Oswald et al. | 342/147 |
| 7,880,609 B2* | 2/2011 | Viegers et al. | 340/539.22 |
| 7,881,838 B2* | 2/2011 | Larschan et al. | 701/35 |
| 2001/0018639 A1 | 8/2001 | Bunn | |
| 2001/0020204 A1 | 9/2001 | Runyon et al. | |
| 2002/0014978 A1 | 2/2002 | Flick | |
| 2002/0070862 A1 | 6/2002 | Francis et al. | |
| 2002/0090955 A1 | 7/2002 | Nelson et al. | |
| 2002/0099502 A1 | 7/2002 | Hilleary | |
| 2002/0128769 A1 | 9/2002 | Der Ghazarian et al. | |
| 2002/0158777 A1 | 10/2002 | Flick | |
| 2003/0016147 A1 | 1/2003 | Evans | |
| 2003/0120364 A1 | 6/2003 | Kirsch | |
| 2003/0141990 A1 | 7/2003 | Coon | |
| 2003/0146854 A1 | 8/2003 | Jones | |
| 2004/0093159 A1 | 5/2004 | Bernesi et al. | |
| 2004/0116116 A1 | 6/2004 | Nadan | |
| 2004/0230372 A1 | 11/2004 | Chang | |
| 2004/0246144 A1 | 12/2004 | Siegel et al. | |
| 2004/0263357 A1* | 12/2004 | Hamilton | 340/936 |
| 2005/0026627 A1 | 2/2005 | Boling et al. | |
| 2005/0038598 A1 | 2/2005 | Oesterling et al. | |
| 2005/0065711 A1* | 3/2005 | Dahlgren et al. | 701/117 |
| 2005/0071079 A1 | 3/2005 | Godfrey et al. | |
| 2005/0083211 A1 | 4/2005 | Shafir et al. | |
| 2005/0088320 A1 | 4/2005 | Kovach | |
| 2005/0174257 A1* | 8/2005 | Shankwitz et al. | 340/909 |
| 2006/0180647 A1* | 8/2006 | Hansen | 235/375 |
| 2006/0265123 A1* | 11/2006 | Chon et al. | 701/209 |
| 2007/0005245 A1* | 1/2007 | Ellis | 701/213 |
| 2007/0061155 A1* | 3/2007 | Ji et al. | 705/1 |
| 2007/0239992 A1* | 10/2007 | White et al. | 713/186 |
| 2008/0001718 A1* | 1/2008 | Karabinis | 340/10.3 |
| 2008/0042836 A1* | 2/2008 | Christopher | 340/568.1 |
| 2008/0068165 A1* | 3/2008 | DeWitt et al. | 340/572.1 |
| 2008/0150761 A1* | 6/2008 | Hines et al. | 340/936 |
| 2008/0154691 A1* | 6/2008 | Wellman et al. | 705/9 |
| 2008/0188217 A1* | 8/2008 | Harter et al. | 455/426.1 |
| 2008/0238690 A1* | 10/2008 | Plant | 340/573.1 |
| 2008/0243350 A1* | 10/2008 | Harkness | 701/93 |
| 2008/0258890 A1* | 10/2008 | Follmer et al. | 340/439 |
| 2008/0294690 A1* | 11/2008 | McClellan et al. | 707/104.1 |
| 2009/0079555 A1* | 3/2009 | Aguirre De Carcer et al. | 340/441 |
| 2009/0115638 A1* | 5/2009 | Shankwitz et al. | 340/988 |
| 2010/0265104 A1* | 10/2010 | Zlojutro | 340/990 |
| 2010/0332266 A1* | 12/2010 | Tamir et al. | 705/4 |
| 2011/0040579 A1* | 2/2011 | Havens | 705/4 |

OTHER PUBLICATIONS

PCTUS2008070037 Written Opinion.

Berger, Ivan; Standards for Car Talk, IEEE, vol. 31, No. 1, Mar. 2007 (pp. 1, 6).

* cited by examiner

SYSTEM AND METHOD TO MONITOR VEHICLES ON A ROADWAY AND TO CONTROL DRIVING RESTRICTIONS OF VEHICLE DRIVERS

TECHNICAL FIELD

Certain embodiments of the present invention relate to vehicle tracking and identification. More particularly, certain embodiments of the present invention relate to a system and method for ranking drivers and monitoring vehicles driven by those ranked drivers on a roadway system.

BACKGROUND OF THE INVENTION

Various systems and methods have been proposed for tracking vehicles on a highway system in a metropolitan area. Such systems and techniques typically rely on vehicles that are equipped with a location-determining unit such as, for example, GPS (global positioning system) receivers to determine a location of a given vehicle at any given time, or sensors actively monitoring the position of vehicles on the highway system. The position information for the vehicles may be transmitted to a central tracking station which keeps track of the vehicles on the highway system. Inertial navigation systems and methods have also been employed to maintain the position information of vehicles with respect to a highway system as the vehicles move along the highway system. Such systems and methods can be expensive and complex, often requiring the position-determining devices to be on each vehicle to be tracked, and often requiring expensive and complex sensors to be positioned at intervals along the highway system.

Published U.S. patent application 2005/0071079 A1 describes a method and apparatus for improving vehicle tracking and remote control. A wireless telecommunications system infrastructure receives a unique vehicle identifier via a shared-communications channel from a vehicle being tracked, as well as location information for that vehicle. The location information is derived from Global Positioning System signals or from the address of the local infrastructure currently in contact with the vehicle, or both. The same shared-communications channel is used to convey control messages to the vehicle, wherein the messages are mapped into control signals that can disable the vehicle's engine or control some other system that is part of the vehicle.

U.S. Pat. No. 5,617,086 describes a traffic monitoring system comprising a set of in-road sensor arrays for providing signals in response to a vehicle traversing the sensor arrays, a processor unit for processing the signals to determine vehicle speed and specific parameters such as axle count and spacing, and a traffic signal or sign controllable by the processor unit.

U.S. Pat. No. 6,345,228 B1 describes a road vehicle sensor that provides an output signal having a magnitude which varies with time through a plurality of values as a vehicle passes the sensor. Signal processing apparatus monitors the timing of sensor signals generated from sensors in adjacent lanes of a highway and provides an indication when such sensor signals could correspond to a double count with a single vehicle being detected by both sensors.

U.S. Pat. No. 4,633,407 describes a method and a device for target tracking of land vehicles for use in heavily meshed city road systems. A motor vehicle device is used with an input device for a desired target location and an output device for vehicle instructions. The vehicle location (determination of travel path and travel location) is carried out by picking up and evaluating the wheel rotations of a non-driven vehicle axis.

U.S. Pat. No. 5,878,367 describes monitoring traffic in individual lanes of a roadway as to vehicle count or presence, speed and direction of movement by mounting a microphone array high above the road surface, digitizing the output signals of the microphones, filtering, beamforming and storing the digitized signals to provide separate power histories for separate locations in individual lanes. These power histories are then analyzed to provide vehicle movement data for each lane.

Published U.S. Patent Application 2005/0088320 A1 describes a system for registering and tracking vehicles. The system comprises an RFID tag affixed to a vehicle and a scanner, wherein the scanner is adapted to query the RFID tag when proximate the RFID tag, effective to obtain information relating to at least one of the vehicle and an owner of the vehicle.

U.S. Pat. No. 6,853,910 B1 describes a method of tracking vehicles comprising monitoring for registration request signal data and receiving the registration request signal data at a call center.

U.S. Pat. No. 6,833,811 B2 describes a method and system for tracking an object by generating GPS coordinates for the object and a bearing associated with a movement of the object.

U.S. Pat. No. 6,737,989 describes a tracking unit for a vehicle that may include a vehicle position determining device, a wireless communications device, and a controller cooperating with the wireless communications device and the vehicle position determining device to determine and send vehicle position information to a monitoring station.

Further limitations and disadvantages of conventional, traditional, and proposed approaches will become apparent to one of skill in the art, through comparison of such systems and methods with the present invention as set forth in the remainder of the present application with reference to the drawings.

BRIEF SUMMARY OF THE INVENTION

An embodiment of the present invention comprises a system for monitoring vehicles on a roadway. The system comprises a plurality of RFID tages affixed at various pre-designated locations along a roadway, wherein each of the RFID tags is encoded with RFID tag information that may be used to determine a physical location of any of the RFID tags on the roadway. The system further comprises a first RFID scanner installed on a first vehicle to interrogate the RFID tags as the first vehicle travels on the roadway and to receive the RFID tag information from the RFID tags as the first vehicle encounters any of the RFID tags on the roadway. The system also comprises a first transceiver installed in the first vehicle and operatively connected to the first RFID scanner to receive the RFID tag information from the first RFID scanner and to re-encode and transmit at least the RFID tag information wirelessly as at least a first RF signal. The system further includes at least one roadside repeater station to wirelessly receive at least the first RF signal from the first transceiver and to re-transmit the information encoded in at least the first RF signal. The system also includes a remote central tracking station to receive and process at least the re-transmitted information from the roadside repeater station in order to at least track a position of at least the first vehicle on the roadway.

Another embodiment of the present invention provides a method to generate a driver ranking profile for a roadway system. The method includes assigning a first driver identification code to a first driver and assigning at least one type or class of vehicle that the first driver is authorized to drive on the roadway system. The method further includes assigning hours of the day that the first driver is authorized to drive on the roadway system for each type or class of vehicle that the first driver is authorized to drive on the roadway system. The method also includes assigning types of lanes that the first driver is authorized to drive in on the roadway system for each vehicle type or class that the first driver is authorized to drive on the roadway system. The method further comprises assigning a speed limit that the first driver is obligated to adhere to while driving on the roadway system for each vehicle type or class that the first driver is authorized to drive on the roadway system. The method also comprises storing the first driver identification code, the assigned type or class of vehicle for the first driver, the assigned hours for the first driver, the assigned types of lanes for the first driver, and the assigned speed limit for the first driver in a database and associating the assigned type or class of vehicle for the first driver, the assigned hours for the first driver, the assigned types of lanes for the first driver, and the assigned speed limit for the first driver with the first driver identification code within the database to form a first driver ranking profile within the database.

These and other advantages and novel features of the present invention, as well as details of an illustrated embodiment thereof, will be more fully understood from the following description and drawings.

DETAILED DESCRIPTION OF THE INVENTION

Figure 1:
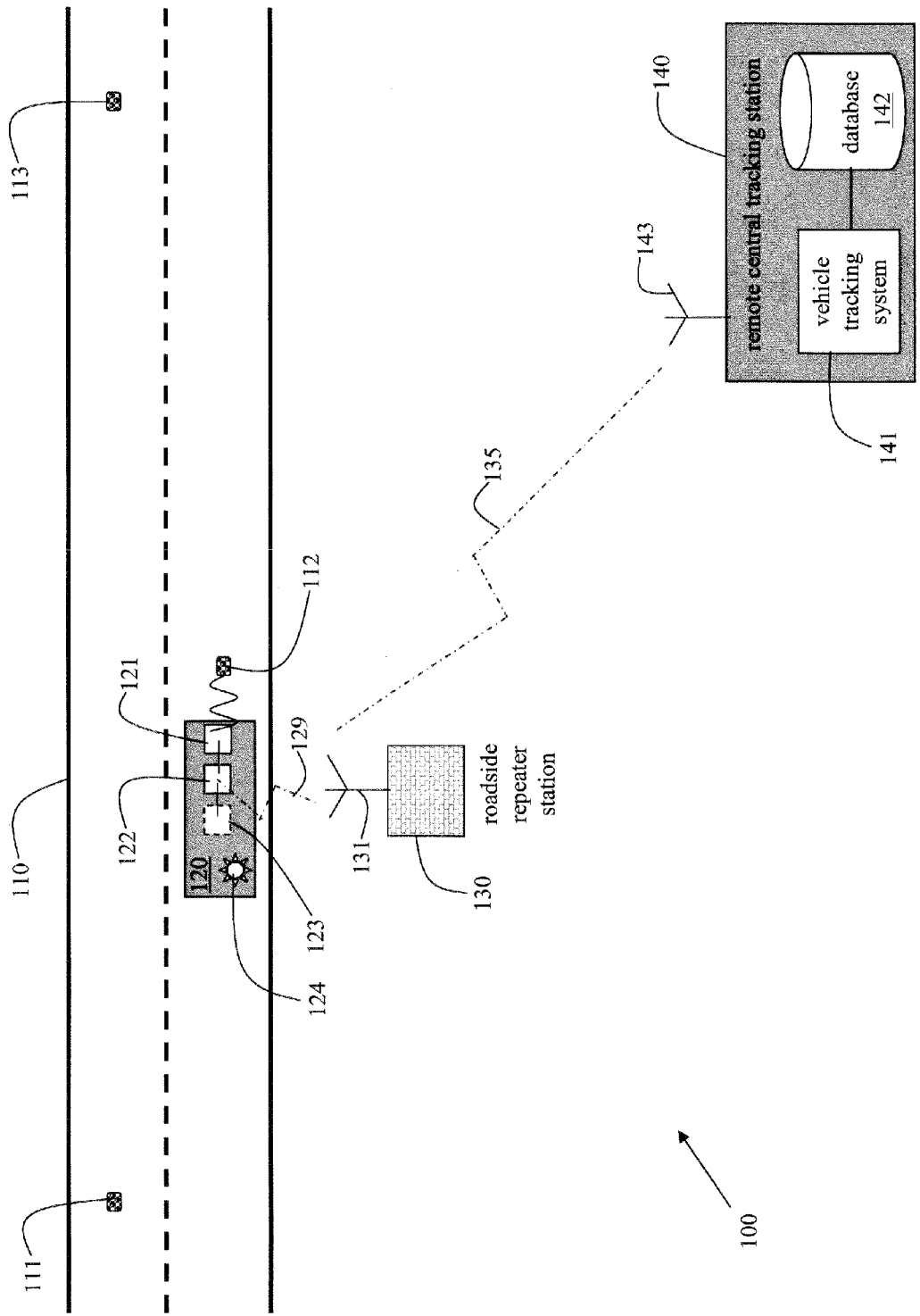
FIG. 1 is a schematic illustration of an exemplary first embodiment of a system for monitoring vehicles on a roadway, in accordance with various aspects of the present invention.

FIG. 1 is a schematic illustration of an exemplary first embodiment of a system 100 for monitoring vehicles on a roadway, in accordance with various aspects of the present invention. The system comprises a plurality of RFID tags (e.g., 111, 112, 113) affixed at various pre-designated locations along a roadway 110. Each RFID tag is encoded with RFID tag information that may be used to determine a physical location of any of the RFID tags on the roadway 110. The RFID tags may be passive RFID tags or active RFID tags and are positioned substantially in the center of the lanes of the roadway, in accordance with an embodiment of the present invention. Other non-centered positions are possible as well. The encoded information within each of the RFID tags may be, for example, physical geographic position information, global positioning system (GPS) coordinates, or a unique RFID tag identification code. The RFID tags (e.g., 111 and 113) in one lane may be staggered with respect to the RFID tags (e.g., 112) in an adjacent lane to help ensure that any given vehicle may interrogate only one RFID tag at any given time.

An RFID tag typically includes an electronic chip which is permanently affixed to a substrate having a small antenna. An RFID tag may or may not be environmentally sealed in a housing. Each RFID tag may be programmed with a unique code and may be tuned to operate at a certain radio frequency which is optimized for the application. Other information may be programmed into the RFID tag as well. An active RFID tag regularly transmits a signal containing the encoded information in the tag. A passive RFID tag transmits a signal containing the encoded information in the tag only when the RFID tag is interrogated by an RFID scanner. The RFID tags of the present invention are environmentally sealed such that they may be affixed in lanes of a roadway and stand up to the environmental conditions of the roadway.

The system 100 further comprises an RFID scanner 121 installed on a vehicle 120 to interrogate the RFID tags (e.g., 112) as the vehicle 120 travels on the roadway 110, and to also receive the RFID tag information from the RFID tags as the vehicle 120 encounters any of the RFID tags (e.g., 111, 112, 113) on the roadway 110. The system 100 also includes a transceiver 122 installed in the vehicle and operatively connected to the RFID scanner 121 to receive the RFID tag information from the RFID scanner and to re-encode and transmit at least the RFID tag information wirelessly as an RF signal 129.

As an option, the system 100 may include a driver's license reader device 123 which is operatively connected to the transceiver 122 to read a driver identification code on a driver's license when the driver's license is presented to the driver's license reader device 123 and to transfer the driver identification code to the transceiver 122. The driver identification code on the driver's license may be read by the reader device 123 in any of a number of ways. For example, the driver's license may be inserted into a slot in the reader device 123 to be read by the reader device 123. Alternatively, the driver's license may be swept in front of the reader device 123 to be read by the reader device 123. The reader device 123 may be an optical reader, a bar code reader, a magnetic strip reader, or any other kind of reader capable of reading a code off of a driver's license or other identifying card, in accordance with various embodiments of the present invention. The transceiver 122 encodes the driver identification code onto the RF signal 129 along with the RFID tag information, in accordance with an embodiment of the present invention.

The scanner 121, transceiver 122, reader device 123, or any combination thereof may each be separate devices or may be integrally combined into a single device, in accordance with various embodiments of the present invention.

The system 100 further includes at least one roadside repeater station 130 to wirelessly receive at least the RF signal 129 from the transceiver 122 and to re-transmit the information encoded in the RF signal 129. The roadside repeater station 130 may include at least one antenna 131 for the reception and/or transmission of RF signals.

The system 100 also comprises a remote central tracking station 140 to receive and process the transmitted information from the roadside repeater station 130 in order to track a position of the vehicle 120 on the roadway 110. The central tracking station 140 may include at least one antenna 143 to receive RF signals transmitted by the roadside repeater station 130.

Figure 2:
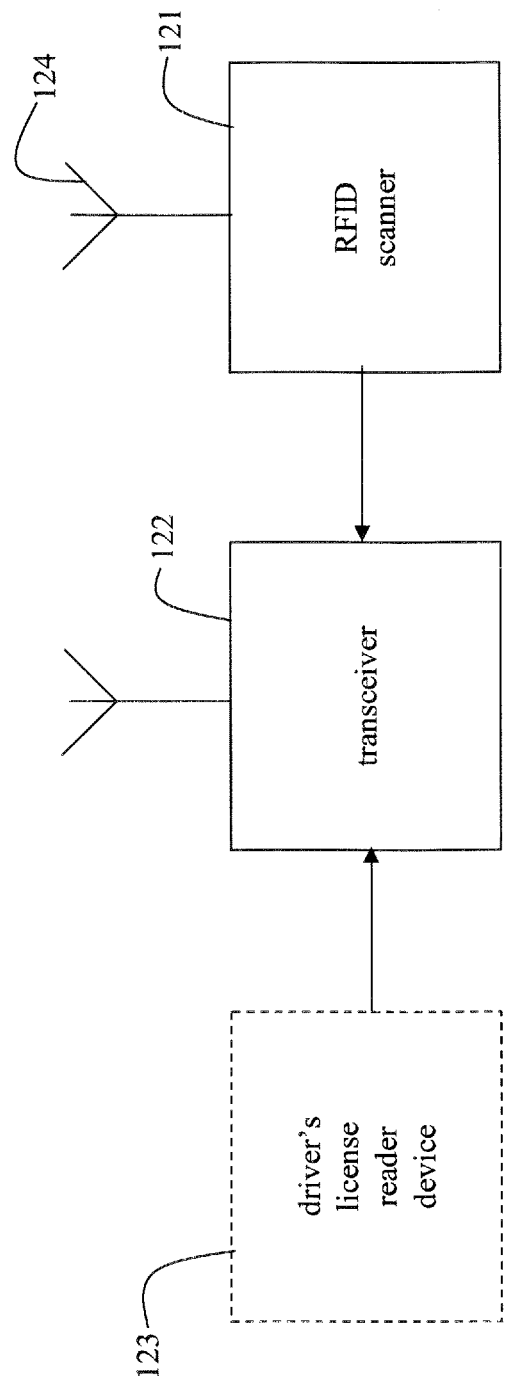
FIG. 2 is a schematic block diagram of an exemplary embodiment of subsystems of the system of FIG. 1 which are installed in a vehicle, in accordance with various aspects of the present invention.

FIG. 2 is a schematic block diagram of an exemplary embodiment of subsystems 121-123 of the system 100 of FIG. 1 which are installed in a vehicle 120, in accordance with various aspects of the present invention. The RFID scanner 121 includes at least one antenna 124 for interrogating the RFID tags along the roadway 110 and for receiving the information encoded in the RFID tags whenever an RFID tag is interrogated by the scanner 121. In accordance with various embodiments of the present invention, the antenna 124 may be mounted on a front portion of the vehicle 120, on a back portion of the vehicle 120, or on a bottom portion of the vehicle 120.

The transceiver 122 is capable of receiving the RFID tag information from the RFID scanner 121 (e.g., over a digital communication link). The transceiver 122 is also capable of receiving a driver identification code from the driver's license reader device 123 (e.g., over a digital communication link). The transceiver 122 is able to encode the RFID tag information and/or the driver identification code onto an RF signal 129. Also, in accordance with an embodiment of the present invention, the transceiver 122 stores a vehicle identification code corresponding to the vehicle 120 in which the transceiver 122 is installed. The transceiver 122 is able to also encode the vehicle identification code onto the RF signal 129 along with the RFID tag information and/or the driver identification code. As a result, any or all of the RFID tag information, driver identification code, and vehicle identification code may be transmitted via RF signal 129 to the roadside repeater station 130. Various known encoding schemes and protocols may be used to encode and transmit the RF signal 129, in accordance with various embodiments of the present invention. Every time the vehicle 120 encounters an RFID tag (e.g., 112) on the roadway 110 and successfully interrogates the encountered RFID tag and receives the RFID tag information from the RFID tag, the transceiver 122 will encode at least the RFID tag information in an RF signal 129 which is transmitted to a roadside repeater station 130.

In accordance with an embodiment of the present invention, the roadside repeater station 130 comprises a simple RF receiver and transmitter. The receiver of the roadside repeater station 130 receives RF signals 129 from vehicles 120 that are within a field-of-reception of the roadside repeater station 130. The roadside repeater station 130 then re-transmits the information encoded in the RF signal 129 as another RF signal 135 using the transmitter of the roadside repeater station 130. The original RF signal 129 transmitted by the transceiver 122 is typically of relatively low power compared to the RF signal 135 transmitted by the roadside repeater station 130. As a result, the transceiver 122 can transmit a relatively low power RF signal 129 to a nearest roadside repeater station 130. The roadside repeater station 130 then boosts the RF signal and transmits a relatively higher power RF signal 135 which may be received by the remote central tracking station 140, which may be quite a distance away from the vehicle 120. The roadside repeater station 130 may re-encode the information in the original RF signal 129 into the RF signal 135 using a different encoding technique than that used to encode the original RF signal 129, and may or may not transmit the RF signal 135 at a different frequency than the RF signal 129, in accordance with various embodiments of the present invention.

The remote central processing station 140 includes a vehicle tracking system 141 and a database 142, operatively connected together. The vehicle tracking system 141 extracts the information encoded in the RF signal 135 and uses the information to track the vehicle 120 on the roadway 110. For example, if the central tracking station 140 receives RFID tag information corresponding to the RFID tag 112 and a vehicle identification code corresponding to the vehicle 120, then the vehicle tracking system 141 is able to correlate the vehicle 120 with the location of the RFID tag 112. When the vehicle 120 encounters another RFID tag on the roadway 110, the vehicle tracking system 141 will be able to update the location of the vehicle 120 on the roadway 110 in a similar manner. As a result, the vehicle tracking system 141 is able to keep track of the vehicle 120 as it travels along the roadway 110.

In accordance with an embodiment of the present invention, whenever the transceiver 122 transmits an RF signal 129 with encoded RFID tag information, a time stamp is also encoded in the RF signal 129. As a result, the vehicle tracking station not only knows the location of the vehicle 120 but also the time at which the vehicle 120 arrived at that location. The vehicle tracking system 141 is able to use the location information and associated time stamp information to calculate an average velocity of the vehicle 120 between any two encountered RFID tag locations. In accordance with an embodiment of the present invention, the vehicle tracking system 141 may be able to use the location and velocity information to predict when the vehicle 120 will arrive at a next RFID tag location along the roadway 110.

In accordance with an embodiment of the present invention, the database 142 includes information which associates the RFID tag 112 with a particular roadway location including the lane in which the RFID tag is located. The database 142 also includes information which associates the vehicle identification code with a particular vehicle 120 and possibly an owner and/or driver of that vehicle 120. Also, the database 142 may include driver ranking profile information which associates various driving restrictions to the driver of the vehicle 120. Alternatively, if the received RF signal 135 includes an encoded driver identification code, then the driver identification code may be used to identify the corresponding driver ranking profile within the database 142.

Figure 3:
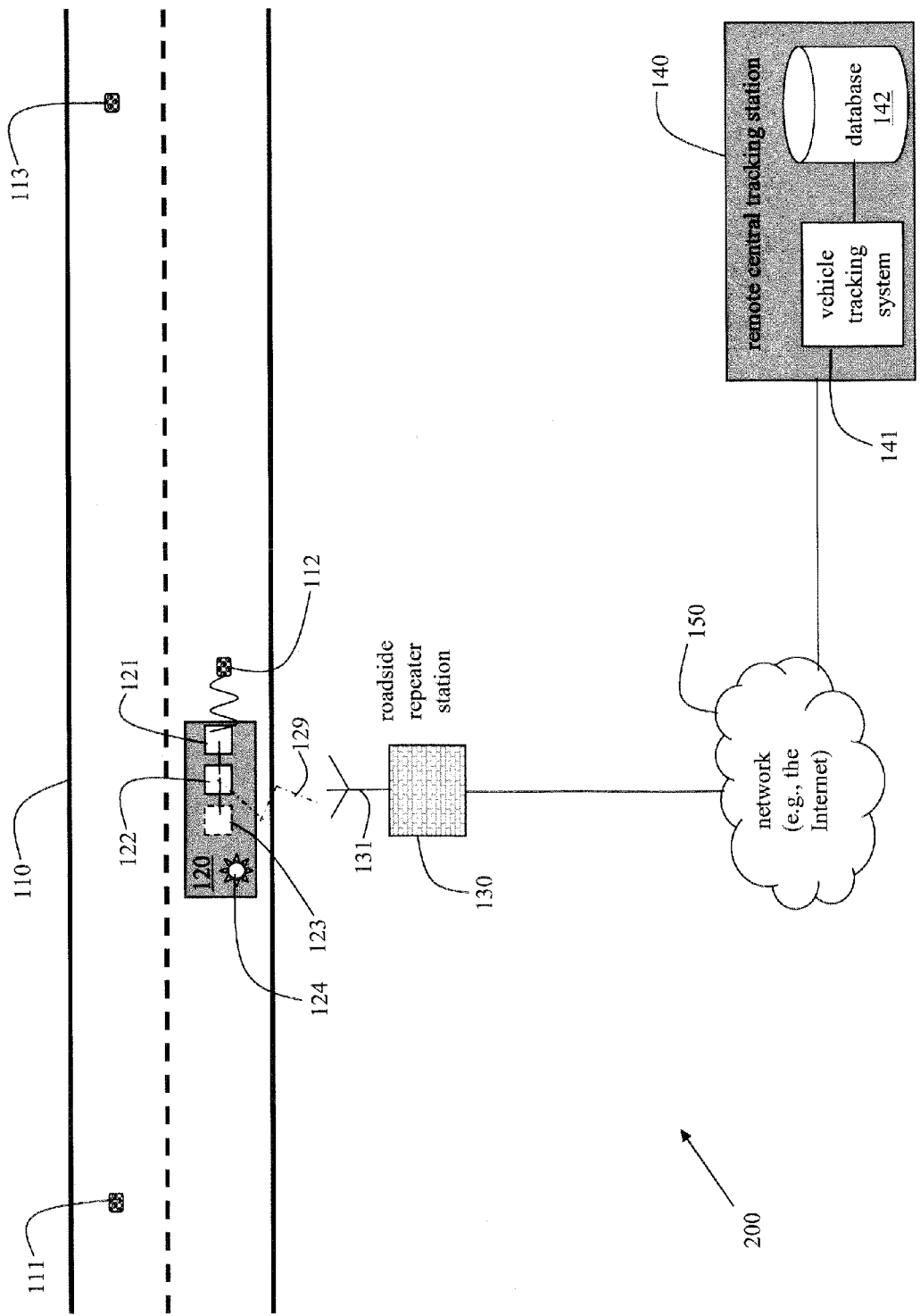
FIG. 3 is a schematic illustration of an exemplary second embodiment of a system for monitoring vehicles on a roadway, in accordance with various aspects of the present invention.

FIG. 3 is a schematic illustration of an exemplary second embodiment of a system 200 for monitoring vehicles on a roadway 110, in accordance with various aspects of the present invention. The system 200 is very similar to the system 100 of FIG. 1 except that the system 200 uses a network 150 (e.g., the Internet) to communicate between the roadside repeater station 130 and the remote central tracking station 140. The network 150 may comprise a totally wired network between the roadside repeater station 130 and the remote central tracking station 140, or a combination of a wired and wireless network. The same type of information, as described for the system 100 of FIG. 1, is conveyed from the roadside repeater station 130 to the central tracking station 140 in the system 200 of FIG. 3. The vehicle tracking system 141 and database 142 of the central tracking station 140 of FIG. 3 operate in a similar manner to that of FIG. 1 as previously described herein.

Figure 4:
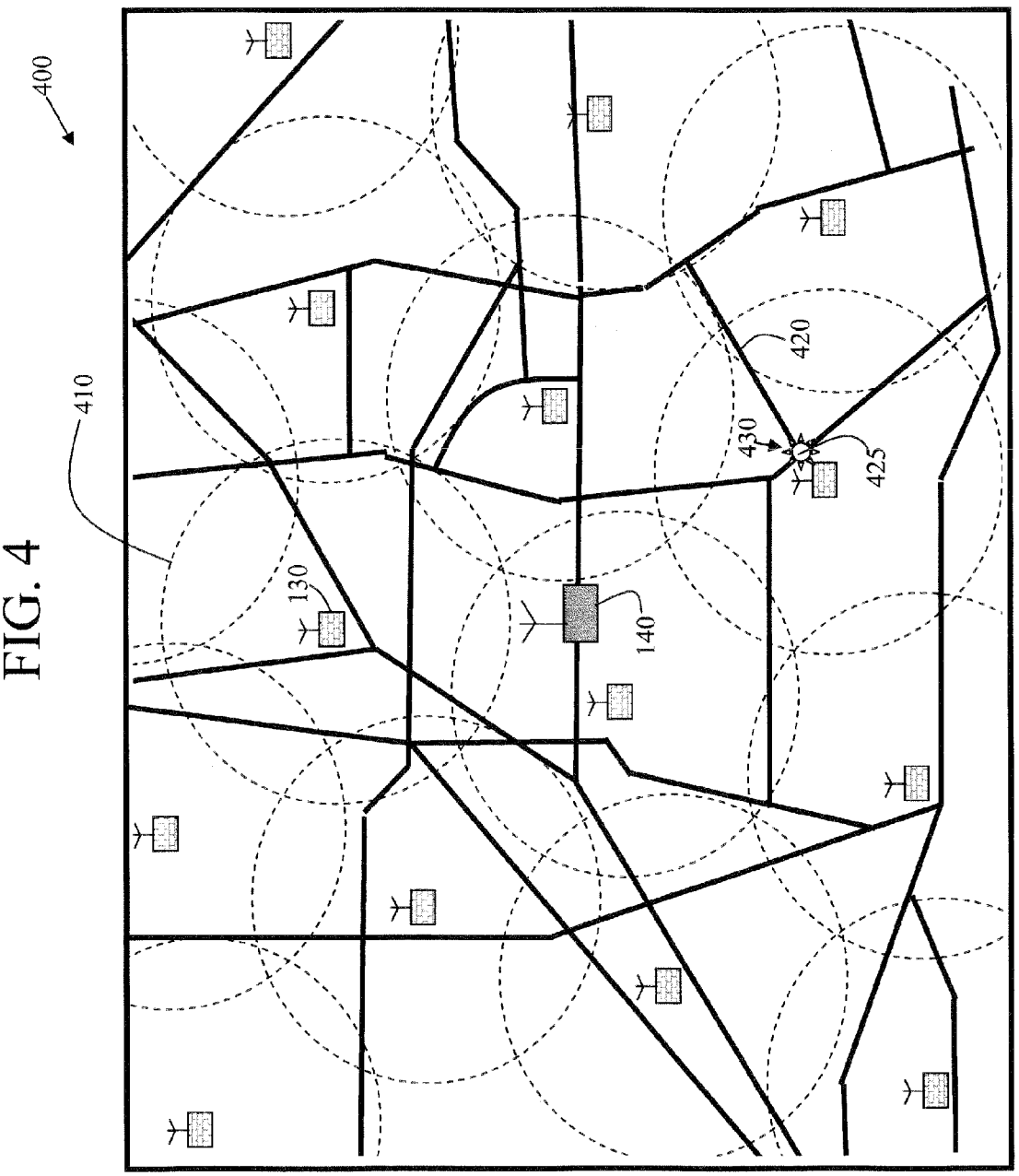
FIG. 4 is a schematic illustration showing the use of the system of FIG. 1 or FIG. 3 on an exemplary roadway, in accordance with an embodiment of the present invention.

FIG. 4 is a schematic illustration showing the use of the system 100 of FIG. 1 or the system 200 of FIG. 3 on an exemplary roadway 400, in accordance with an embodiment of the present invention. The roadway 400 includes a plurality of RFID tags strategically located along the roadway 400. For example, an RFID tag may be positioned every 200 feet along the roadway 400. A plurality of roadside repeater stations 130 are strategically placed at various locations along the roadway 400. Each roadside repeater station 130 includes a circle of reception 410 such that an RF signal 129 transmitted by any vehicle 120 within the circle of reception 410 may be received by that roadside repeater station 130 with a high probability of correct reception. The roadside repeater stations 130 are positioned such that the circles of reception 410 overlap such that a vehicle on any part of the roadway 400 may communicate with at least one roadside repeater station 130. A remote central tracking station 140 is strategically located on the roadway 400 such that any of the roadside repeater stations 130 may effectively communicate with the central tracking station 140. As a result, as vehicles (which are equipped with at least the RFID scanner and transceiver capabilities as previously described herein) travel along the various branches of the roadway 400, the vehicles will be able to be tracked by the central tracking station 140.

Figure 5:
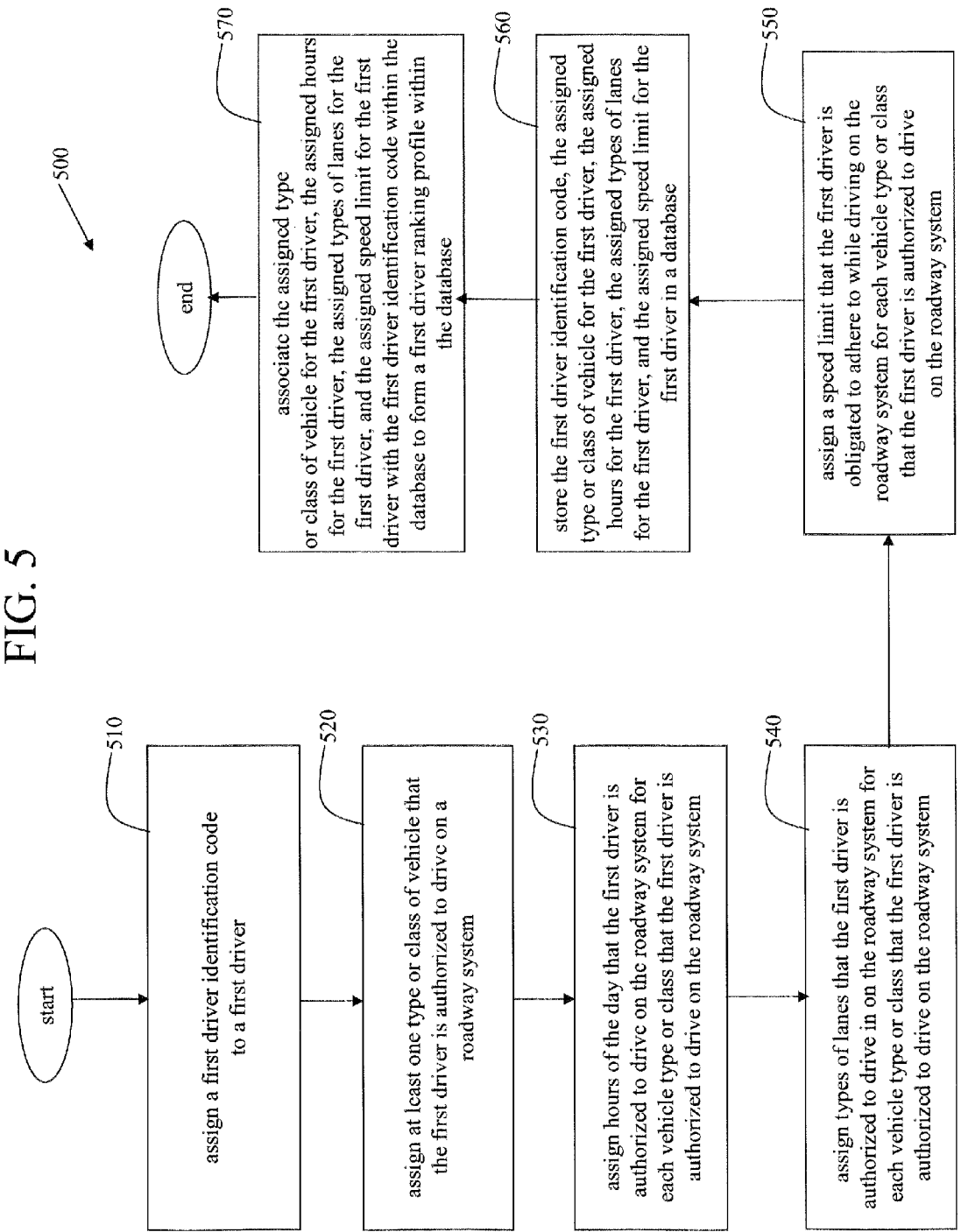
FIG. 5 is a flowchart of an exemplary embodiment of a method to generate a driver ranking profile for a roadway system which uses the system of FIG. 1 or FIG. 3, in accordance with various aspects of the present invention.

FIG. 5 is a flowchart of an exemplary embodiment of a method 500 to generate a driver ranking profile for a roadway system which uses the system 100 of FIG. 1 or the system 200 of FIG. 3, in accordance with various aspects of the present invention. In step 510, a first driver identification code is assigned to a first driver. In step 520, at least one type or class of vehicle that the first driver is authorized to drive on the roadway system is assigned. In step 530, hours of the day that the first driver is authorized to drive on the roadway system are assigned for each vehicle type or class that the first driver is authorized to drive on the roadway system. In step 540, types of lanes that the first driver is authorized to drive in on the roadway system are assigned for each type or class of vehicle that the first driver is authorized to drive on the roadway system. In step 550, a speed limit that the first driver is obligated to adhere to while driving on the roadway system is assigned for each type or class of vehicle that the first driver is authorized to drive on the roadway system. In step 560, the first driver identification code, the assigned type or class of vehicle for the first driver, the assigned hours for the first driver, the assigned types of lanes for the first driver, and the assigned speed limit for the first driver are stored in a database. In step 570, the assigned type or class of vehicle for the first driver, the assigned hours for the first driver, the assigned types of lanes for the first driver, and the assigned speed limit for the first driver are associated with the first driver identification code within the database to form a first driver ranking profile within the database.

In accordance with an embodiment of the present invention, the method 500 may further include assigning a first unique vehicle identification code to at least one vehicle that the first driver is authorized to drive on the roadway system, storing the first vehicle identification code within the database, and associating the first vehicle identification code with the first driver identification code within the database.

In accordance with an embodiment of the present invention, the database in which the various driver ranking profile parameters are stored and associated is the database 142 of FIG. 1. As a result, when a vehicle is being tracked by the system 100 on a roadway, the driver ranking profile may be correlated with the vehicle and the driver of the vehicle.

In accordance with various embodiments of the present invention, the assigned driver identification code may comprise, for example, a driver's license number from a driver's license of the first driver, a social security number, or some other identification code which can be made unique to the first driver by assigning the code to the first driver. The type or class of vehicle may include, for example, a 4-wheeled passenger vehicle, a tractor-trailer vehicle, a farm vehicle, a limousine, a school bus, a public transportation vehicle, and a commercial vehicle. The hours of the day may include daylight hours and non-daylight hours, for example. The types of lanes may include, for example, a passing lane, a traveling lane, a carpool lane, an express lane, a local lane, a rush-hour lane, a car lane, a truck lane, and a commercial vehicle lane.

In accordance with an embodiment of the present invention, speed limits may be assigned to driver's which are different from the posted speed limits. For example, a posted speed limit on a particular stretch of roadway may be 65 miles per hour. However, the first driver of the method 500 of FIG. 5 may be restricted to adhering to a speed limit of 55 miles per hour on that part of the roadway. Such a restriction may be the result of a vision test or a reflex test, for example, previously given to the first driver by an authorizing agency (e.g., a department of motor vehicles).

In general, the various assigned restrictions of a driver ranking profile may be determined based on a test taken by the associated driver. Assigned restrictions may also be based on, for example, a driving record of the driver, an age of the driver, a vehicle of the driver, and a criminal record of the driver.

In the case where the central tracking station 140 is tracking a vehicle 120 on the roadway 110 and the database 142 includes a driver ranking profile of the driver of the vehicle 120, various communicative interactions may take place between the central tracking station 140 and the vehicle 120. For example, the central tracking station 140 may transmit a warning message signal to the transceiver 122 in the vehicle 120, either directly, or indirectly via the roadside repeater station 130. The warning message signal may indicate that the vehicle 120 and the associated driver is traveling in an unauthorized lane of the roadway 110, for example. The warning message signal may indicate that the vehicle 120 and associated driver is traveling on the roadway 110 at an unauthorized time of day, for example. The warning message signal may indicate that the vehicle 120 and the associated driver is traveling at an unauthorized speed, for example. The warning message signal may indicate that the driver of the vehicle 120 is not authorized to drive the vehicle 120 on the roadway 110 because the vehicle 120 is not associated with that driver in the database 142. As another example, the central tracking station 140 may transmit a disabling signal to the transceiver 122 in the vehicle 120, either directly, or indirectly via the roadside repeater station 130. The disabling signal is used to disable the vehicle in some manner. For example, the disabling signal may be used to close a valve, cutting off fuel to the engine of the vehicle.

In accordance with an embodiment of the present invention, the transceiver 122 in the vehicle 120 knows when the remote central tracking station 140 is trying to communicate with the transceiver 122 because the central tracking station 140 transmits the vehicle identification code as part of the warning message. If the transmitted vehicle identification code from the central tracking station 140 matches the stored vehicle identification code within the transceiver 122, then the transceiver knows that the warning message is intended for the transceiver 122. If the vehicle identification codes don't match, then the transceiver 122 ignores the warning message. Other techniques could be used, instead, to discern which vehicle the central tracking station 140 is attempting to communicate with. For example, each vehicle on the roadway could be assigned a unique radio frequency. This may not be very practical, however. Also, spread spectrum coding techniques could be used such that each vehicle on the roadway would have a unique code which it uses to decode any signals received from the central tracking station 140 (or the roadside repeater station 130). Other techniques are possible as well.

In accordance with an embodiment of the present invention, the system 100 may include at least one warning indicator device 124 in the vehicle 120 such that a warning message signal from the central tracking station 140 triggers the warning indicator device 124 to activate within the vehicle 120 to warn the driver of the vehicle 120. The system 100 may also include at least one warning indicator device 124 on an outside of the vehicle 120 such that a warning message signal triggers the warning indicator device 124 to activate on the outside of the vehicle 120 to warn other drivers on the roadway 110 that are in proximity to the vehicle 120.

Figure 6:
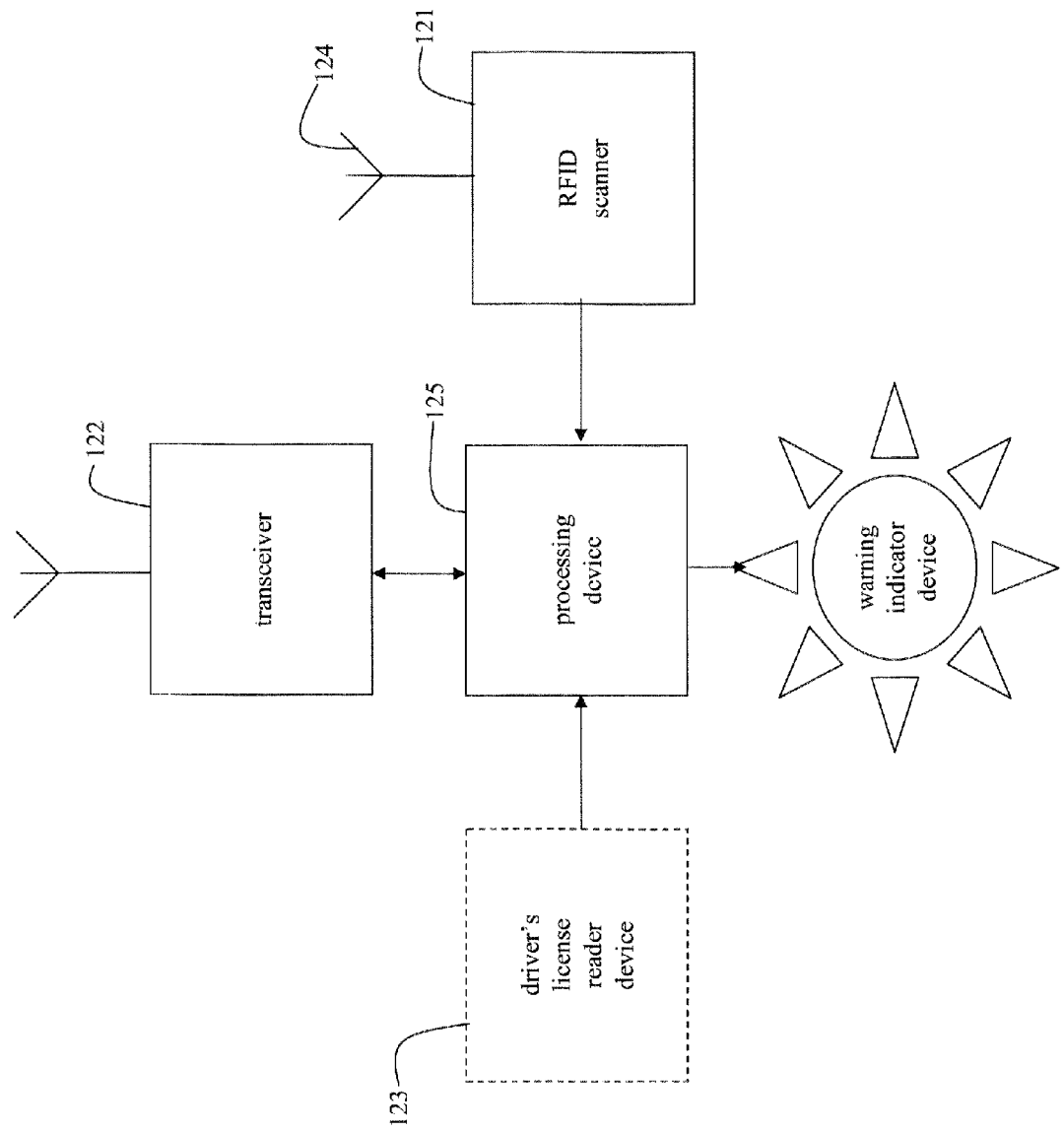
FIG. 6 is a schematic block diagram of an exemplary alternative embodiment of subsystems of the system of FIG. 1 which are installed in a vehicle, in accordance with various aspects of the present invention.

The warning indicator device may include, for example, a display, a light, a flashing light, an audible sound generator, or some other type of indicator device. In accordance with an embodiment of the present invention, the warning indicator device 124 is operatively connected to the transceiver 124. In accordance with an alternative embodiment of the present invention, the system 100 includes a processing device 125 operatively connected between the transceiver 122 and the warning indicator device 124 (see FIG. 6). FIG. 6 is a schematic block diagram of an exemplary alternative embodiment of subsystems of the system of FIG. 1 which are installed in a vehicle, in accordance with various aspects of the present invention. In such an alternative embodiment, the transceiver 122 forwards the warning message to the processing device 125. The processing device 125 processes the warning message and sends an activation signal to the warning indicator device 124. In such an embodiment, the RFID scanner 121 and the driver's license reader device 123 may also be operatively connected to the processing device 125 as well (see FIG. 6).

Figure 7:
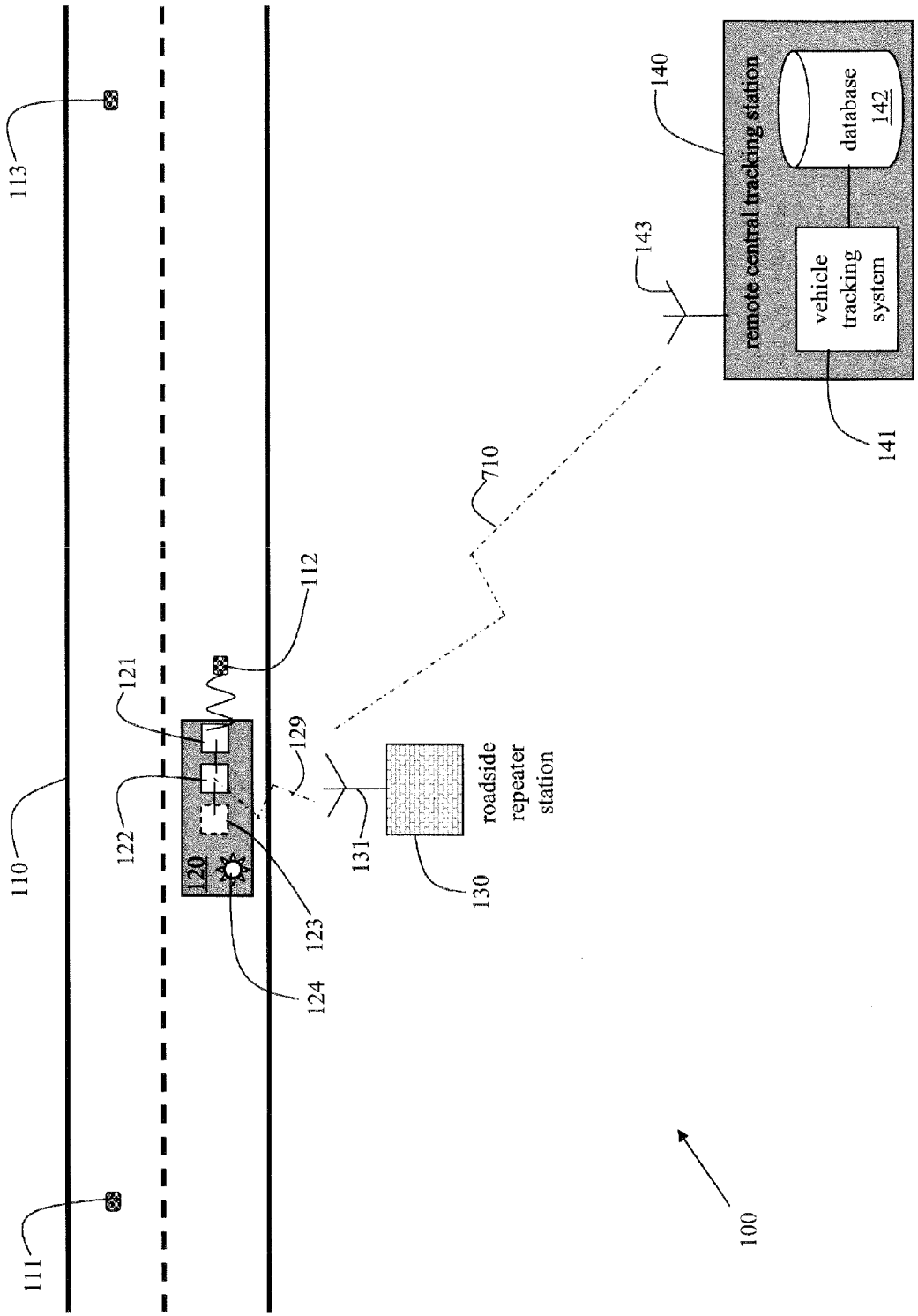
FIG. 7 is a schematic illustration of the exemplary embodiment of FIG. 1 of a system for monitoring vehicles on a roadway and further showing how warning messages are communicated, in accordance with various aspects of the present invention.

For example, as a driver of the vehicle 120 travels along the roadway 110, the remote central tracking station 140 is tracking the vehicle 120 and the associated driver, estimating an average speed of the vehicle 120, and comparing the various tracked parameters of the vehicle 120 with the associated driver ranking profile of the driver which is stored in the database 142. If the central tracking station 140 determines that the vehicle is exceeding a restricted speed limit for the driver as stored in the driver's ranking profile, then the central tracking station 140 sends a warning message to the vehicle 120 encoded in an RF signal 710 (see FIG. 7) from the central tracking station 140 to the vehicle 120. The transceiver 122 in the vehicle 120 receives the warning message signal and sends the warning message to the warning indicator device 124 within the vehicle 120. In this example, the warning indicator device 124 is a display which displays the warning message which may be viewed by the driver. The warning message indicates to the driver that he is exceeding his restricted speed limit for the vehicle 120 on the roadway 110. The warning message may also indicate to the driver the actual speed limit which he is restricted to on the roadway 110.

As another example, as a driver of the vehicle 120 travels along the roadway 110, the remote central tracking station 140 is tracking the vehicle 120 and the associated driver and comparing the various tracked parameters of the vehicle 120 with the associated driver ranking profile restrictions of the driver which are stored in the database 142. If the central tracking station 140 determines that the vehicle is driving in an unauthorized lane according to the driver's ranking profile, then the central tracking station 140 sends a warning message to the vehicle 120 encoded in an RF signal 710 (see FIG. 7) from the central tracking station 140 to the vehicle 120. The transceiver 122 in the vehicle 120 receives the warning message signal and sends the warning message to the warning indicator device 124 on the outside of the vehicle 120. In this example, the warning indicator device 124 is a flashing light to indicate to other drivers in proximity to the vehicle 120 (e.g., a police officer) that the vehicle 120 is not in an authorized lane. Also, the warning message may be displayed to the driver inside the vehicle to indicate to the driver that he is driving in an unauthorized lane on the roadway 110 (i.e., there is a second warning indicator device 124 within the vehicle 120 which is a display, as in the previous example). The displayed warning message may also indicate to the driver which lane or lanes he is authorized to drive in on the roadway 110.

Warning message signals may be relayed from the central tracking station 140 to the vehicle 120 for other driver ranking profile restriction violations as well such as, for example, driving at an unauthorized time of day or driving an unauthorized vehicle. Also, in accordance with an embodiment of the present invention, a warning message signal may be relayed from the central tracking station 140 to the vehicle 120 to alert the driver of the vehicle 120 about an approaching emergency vehicle. The central tracking station 140 tracks the emergency vehicle in a similar manner to how the vehicle 120 is tracked. As a result, the central tracking station 140 knows the location of the emergency vehicle with respect to the location of the tracked vehicle 120 and can, therefore, send a corresponding warning message signal to the tracked vehicle 120. Similarly, in accordance with an embodiment of the present invention, a warning message signal may be relayed from the central tracking station 140 to the vehicle 120 to alert the driver of the vehicle 120 about a construction zone that the vehicle 120 is approaching or about an accident that the vehicle is approaching.

Figure 8:
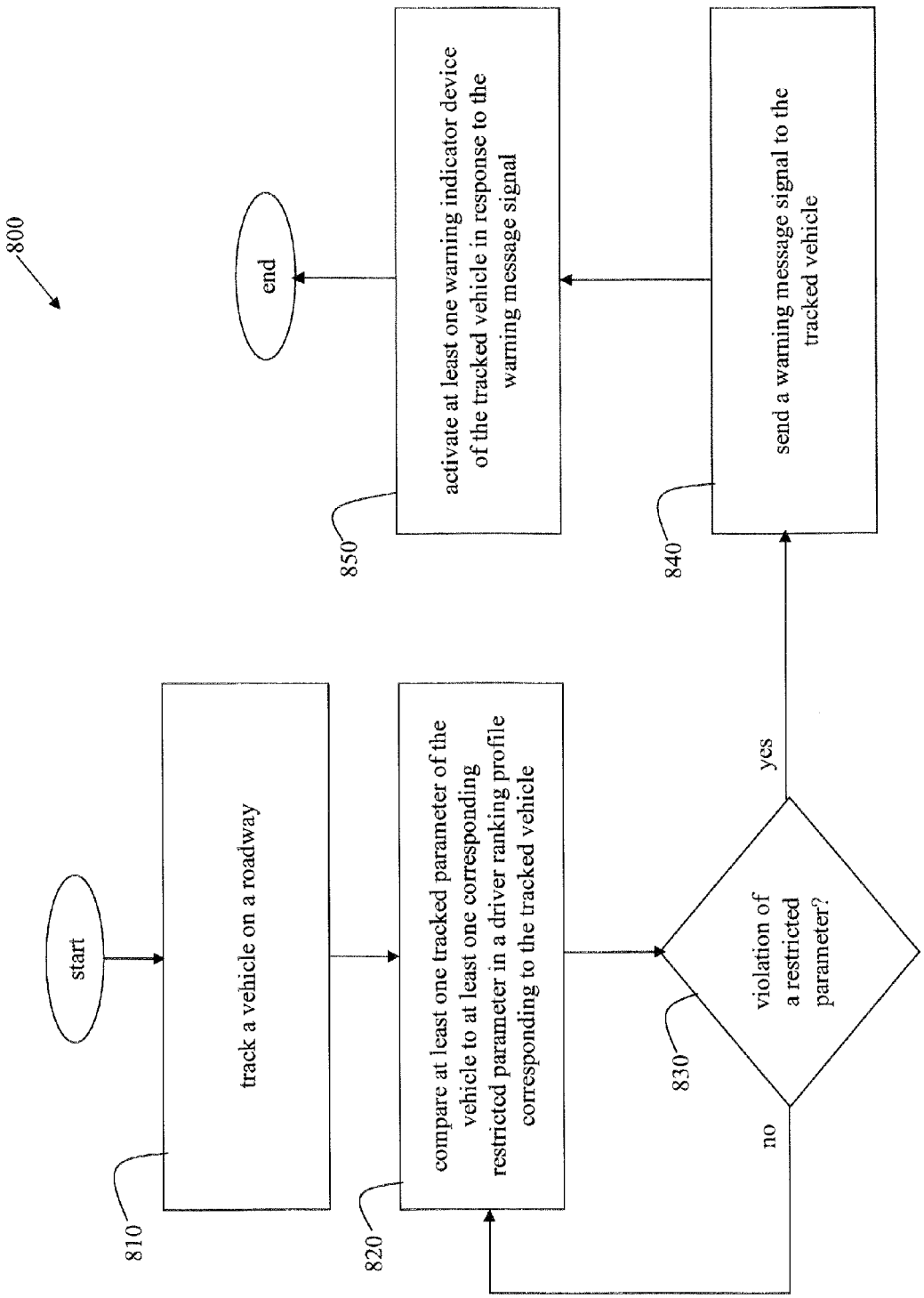
FIG. 8 illustrates an exemplary embodiment of a method for generating and sending warning messages using the various systems and methods described herein, in accordance with various aspects of the present invention.

FIG. 8 illustrates an exemplary embodiment of a method 800 for generating and sending warning messages using the various systems and methods described herein, in accordance with various aspects of the present invention. In step 810, a vehicle is tracked on a roadway. In step 820, at least one tracked parameter of the vehicle is compared to at least one corresponding restricted parameter in a driver ranking profile corresponding to the tracked vehicle. In step 830, a decision is made, based on the comparison in step 820, as to whether or not there has been a violation of a restricted parameter. If there has not been a violation of a restricted parameter, the method 800 reverts back to step 820. If there has been a violation of a restricted parameter, the method goes to step 840 where a warning message signal is sent to the tracked vehicle. In step 850, at least one warning indicator device of the tracked vehicle is activated in response to the warning message signal.

In accordance with an embodiment of the present invention, the central tracking station 140 generates statistical data corresponding to the vehicle 120 being tracked on the roadway 110 using at least the received RFID tag information transmitted from the vehicle 120. The statistical data may be used to modify driver ranking information within the driver ranking profile associated with the driver of the vehicle 120.

For example, the central tracking station 140 may generate statistical data with respect to a speed at which the driver of a vehicle 120 drives at over a period of time (e.g., several months) with respect to a restricted speed limit for that driver. The central tracking station 140 may also keep track of the number of times the driver violates the restricted speed limit. The central tracking station 140 may also keep track of the number of times the driver violates a lane restriction.

For example, the driver may be a new driver (e.g., a teenager) who is learning to drive. The new driver may be restricted to a speed limit of 55 mph and to driving in the right-most lane when traveling on a highway. The central tracking station 140 may collect statistics on the new driver over a period of, for example, 3 months. If the statistical parameters associated with the new driver are favorable, the central tracking station 140 may upgrade the new driver's ranking profile by, for example, raising the speed limit in the profile to 65 mph and allowing the driver to drive in all lanes of the highway. The upgraded privileges may be communicated to the new driver via the system 100 similar to how a warning message signal is communicated and displayed to a driver.

Figure 9:
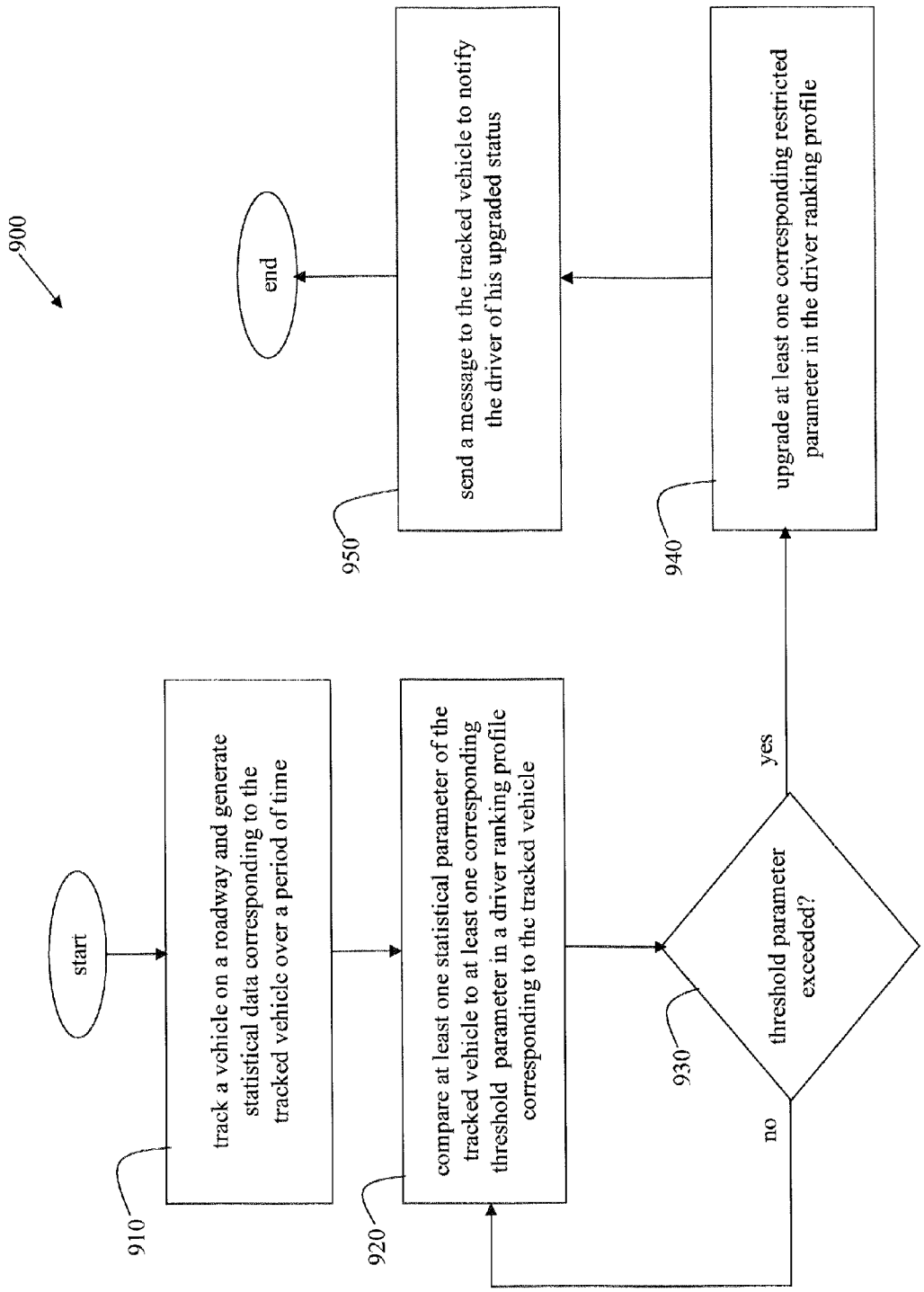
FIG. 9 illustrates an exemplary embodiment of a method for generating statistical data and upgrading a driver's ranking profile using the various systems and methods described herein, in accordance with various aspects of the present invention.

FIG. 9 illustrates an exemplary embodiment of a method 900 for generating statistical data and upgrading a driver's ranking profile using the various systems and methods described herein, in accordance with various aspects of the present invention. In step 910, a vehicle is tracked on a roadway and statistical data is generated corresponding to the tracked vehicle over a period of time. In step 920, at least one statistical parameter of the tracked vehicle is compared to at least one corresponding threshold parameter in a driver ranking profile corresponding to the tracked vehicle. In step 930, a decision is made as to whether or not the threshold parameter has been exceeded, based on the comparison made in step 920. If the threshold parameter has not been exceeded, then the method 900 reverts back to step 920. If the threshold parameter has been exceeded, then in step 940, at least one corresponding restricted parameter in the driver ranking profile is upgraded. In step 950, a message is sent to the tracked vehicle to notify the driver of his upgraded status.

In accordance with another embodiment of the present invention, the gathered statistical data may be used by a driver's insurance company to reduce or increase his insurance premiums based on his personal statistics, instead of relying on other general population statistics which are not specifically related to a specific driver but instead, to a population of drivers.

In accordance with an embodiment of the present invention, the central tracking station 140 may keep track of a status of a driver's license and may notify the authorities if the central tracking station 140 detects a driver driving a vehicle on the roadway with a suspended license, for example. The status of a driver's license may simply be another entry in the driver ranking profile and may be updated in the database 142 whenever the status changes.

The various systems and methods described herein for a single vehicle (e.g., 120) may be applied to a plurality of vehicles traveling on a roadway (e.g., 400), each being equipped with at least an RFID scanner 121 and a transceiver 122, if not also a driver's license reader device 123, at least one warning indicator device 124, and/or a processing device 125. As a result, the remote central tracking station 140 may track multiple vehicles on the roadway essentially in real time, providing warning messages and status information, as necessary to each vehicle.

As the central tracking station 140 tracks a plurality of vehicles on a roadway, the central tracking station generates traffic flow data, in accordance with an embodiment of the present invention. For example, the central tracking station 140 can determine the volume and average speed of traffic along various sections of the roadway at a given time. Even if not every vehicle on the roadway is being tracked (e.g., not all vehicles on the roadway may have the RFID scanner 121 and transceiver 122 installed), the central tracking station 140 may be able to extrapolate from the number of vehicles being tracked to an estimate of the actual number of vehicles on the roadway. As a result, fairly accurate traffic flow data may be generated.

In accordance with an embodiment of the present invention, the central tracking station 140 may use the generated traffic flow data to change the operation of traffic control devices associated with the roadway. For example, if the generated traffic flow data is showing significant traffic volume and congestion on a road section 420 (see FIG. 4) of roadway 410, the central tracking station 140 may transmit a traffic control signal to a traffic light 425 at the intersection 430 to change the timing of the traffic light such that the congestion on the road section 420 is relieved. Other traffic control signals, generated in response to traffic flow data, are possible as well.

Figure 10:
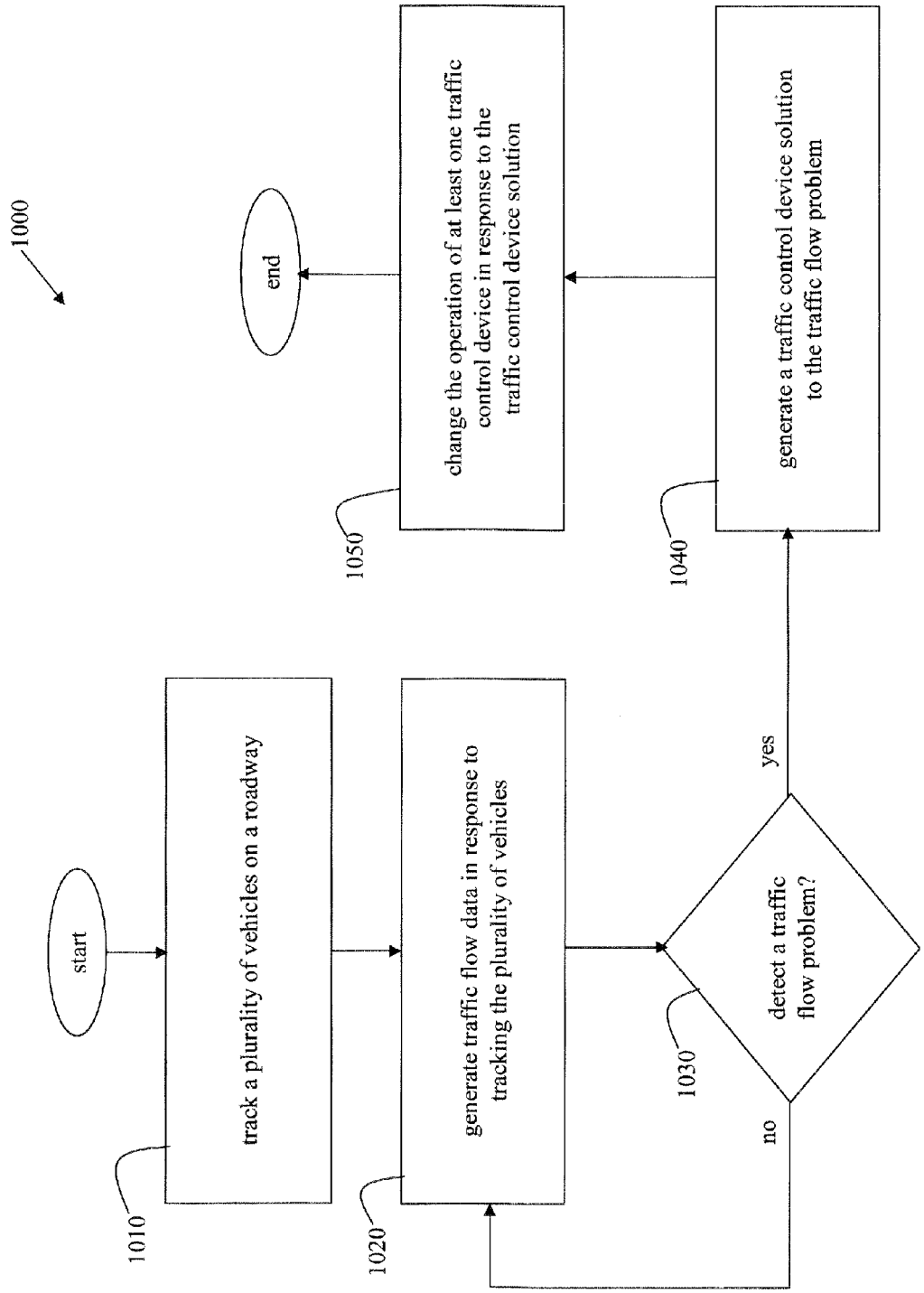
FIG. 10 illustrates an exemplary embodiment of a method for tracking a plurality of vehicles and generating traffic flow data using the various systems and methods described herein, in accordance with various aspects of the present invention.

FIG. 10 illustrates an exemplary embodiment of a method 1000 for tracking a plurality of vehicles and generating traffic flow data using the various systems and methods described herein, in accordance with various aspects of the present invention. In step 1010, a plurality of vehicles is tracked on a roadway. In step 1020, traffic flow data is generated in response to tracking the plurality of vehicles. In step 1030, a decision is made as to whether or not a traffic flow problem is detected. If a traffic flow problem is not detected, the method 1000 reverts back to step 1020. If a traffic flow problem is detected, in step 1040, a traffic control device solution to the traffic flow problem is generated. In step 1050, the operation of at least one traffic control device is changed in response to the traffic control device solution.

In accordance with an alternative embodiment of the present invention, instead of having RFID tags positioned on the roadway, each vehicle may have an RFID tag affixed to the vehicle (e.g., affixed to or embedded in a license plate on the vehicle) and RFID scanners may be strategically positioned along the roadway to scan the RFID tags of vehicles as they pass by the scanners. The scanned RFID tag information may then be passed from the scanner to a transceiver co-located with each scanner such that the RFID tag information is transmitted to a roadside repeater station and then passed to a remote central tracking station as previously described. The scanned RFID tag information may contain a vehicle identification code. Furthermore, the scanned RFID information may contain data indicating that the owner of the vehicle has at least one DUI (driving while intoxicated) convection. The location of a scanned vehicle is known from the known position of the RFID scanner which scanned the vehicle. In accordance with a further alternative embodiment of the present invention, the transceiver could be the roadside repeater.

If such RFID scanners/transceivers are positioned along the sides of a roadway, it may be difficult, if not impossible, to determine a lane in which the scanned vehicle is driving. It may also be difficult, if not impossible, to scan vehicles which are not in a lane which is directly adjacent to a side of the roadway. Installing RFID scanners/transceivers in the middle of a lane may prove to be impractical. However, future advances in technology may make this practical at some point in time.

Also, such an alternative embodiment does not, by itself, allow for a driver identification code to be read from a driver's license, for example. The RFID tag on a vehicle may be encoded with a driver identification code. However, if someone else, other than the driver associated with the driver identification code, is driving the vehicle, a corresponding driver ranking profile that is used by the system would not correspond to the actual present driver of the vehicle. Such an anomaly may not be that important, however. Also, in such an alternative embodiment, the ability to transmit warning messages to a vehicle may not be possible without other subsystems incorporated into the vehicle.

In summary, embodiments of the present invention provide systems and methods for tracking and monitoring vehicles on a roadway and using driver ranking profiles to restrict and provide privileges to drivers using the roadway. The systems and methods also provide the capability to warn drivers of restriction violations and to control traffic control devices based on traffic flow data generated in response to tracking the vehicles on the roadway.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A system for monitoring vehicles on a roadway, said system comprising:
   a plurality of RFID tags affixed at various pre-designated locations along a roadway, wherein each of said RFID tags is encoded with RFID tag information that may be used to determine a physical location of any of said RFID tags on said roadway;
   a first RFID scanner installed on a first vehicle to wirelessly interrogate said RFID tags as said first vehicle travels on said roadway and/or to wirelessly receive said RFID tag information from said RFID tags as said first vehicle encounters any of said RFID tags on said roadway;
   a first transceiver installed in said first vehicle and operatively connected to said first RFID scanner to receive said RFID tag information from said first RFID scanner and to re-encode and transmit at least said RFID tag information wirelessly as at least a first RF signal;
   at least one roadside repeater station to wirelessly receive at least said first RF signal from said first transceiver and to re-transmit the information encoded in at least said first RF signal; and
   a remote central tracking station, having at least one database, wherein the remote central tracking station is configured to:
      receive and process said re-transmitted information from said roadside repeater station to generate statistical data corresponding to operation of the first vehicle by a driver of the first vehicle; and
      modify at least one driving restriction of the driver, stored in the database, based on the statistical data, wherein the at least one driving restriction includes at least one of a time of day the driver is allowed to drive, driving lanes the driver is allowed to drive in, a maximum speed the driver is allowed to drive, and a type of vehicle the driver is allowed to drive.

2. The system of claim 1 further comprising:
   a second RFID scanner installed on a second vehicle to wirelessly interrogate said RFID tags as said second vehicle travels on said roadway and/or to wirelessly receive said RFID tag information from said RFID tags as said second vehicle encounters any of said RFID tags on said roadway; and
   a second transceiver installed in said second vehicle and operatively connected to said second RFID scanner to receive said RFID tag information from said second RFID scanner and to re-encode and wirelessly transmit at least said RFID tag information as a second RF signal to said roadside repeater station.

3. The system of claim 2 wherein said second RFID scanner includes an antenna that is mounted to a front portion of said second vehicle.

4. The system of claim 2 wherein said second RFID scanner includes an antenna that is mounted to a back portion of said second vehicle.

5. The system of claim 2 wherein said second RFID scanner includes an antenna that is mounted to a bottom portion of said second vehicle.

6. The system of claim 2 wherein said second transceiver also transmits a second vehicle identification code corresponding to said second vehicle as part of said second RF signal.

7. The system of claim 2 wherein said second transceiver also transmits time stamp information as part of said second RF signal.

8. The system of claim 2 further comprising a second driver's license reader device operatively connected to said second transceiver to read a driver identification code on a driver's license that is presented to said second driver's license reader device and to transfer said driver identification code to said second transceiver.

9. The system of claim 8 wherein said second transceiver encodes said driver identification code into said second RF signal.

10. The system of claim 9 wherein said central tracking station determines a status of said driver's license and notifies the authorities if said status of said driver's license is that of being suspended.

11. The system of claim 2 wherein said central tracking station tracks a current roadway location of said second vehicle using at least said received RFID tag information transmitted from said second vehicle.

12. The system of claim 2 wherein said central tracking station estimates a current speed of said second vehicle using at least said received RFID tag information transmitted from said second vehicle.

13. The system of claim 2 wherein said central tracking station and said at least one database to store and correlate information, including vehicle identification codes, driver identification codes, RF tag location information, and driver ranking information.

14. The system of claim 13 wherein said driver ranking information includes at least one of hours allowed to drive, lanes allowed to drive in, speed allowed to drive at, and type of vehicle allowed to drive, for each driver identification code stored in said at least one database.

15. The system of claim 13 wherein said driver ranking information, for any driver identified in said at least one database by one of said driver identification codes, is determined based on at least one of a driving record of said driver, an age of said driver, a vehicle of said driver, a test taken by said driver, and a criminal record of said driver.

16. The system of claim 2 wherein said central tracking station transmits a second warning message signal, either directly or indirectly, to said second transceiver of said second vehicle.

17. The system of claim 16 wherein said second warning message signal indicates that said second vehicle is traveling in a lane of said roadway in which said second vehicle and/or a driver of said second vehicle is not authorized to travel.

18. The system of claim 16 wherein said second warning message signal indicates that said second vehicle is traveling on said roadway at a time of day for which said second vehicle and/or a driver of said second vehicle is not authorized to travel on said roadway.

19. The system of claim 16 wherein said second warning message signal indicates that said second vehicle is traveling on said roadway at an unauthorized speed.

20. The system of claim 16 wherein said second warning message signal indicates that a driver of said second vehicle is not authorized to drive said second vehicle on said roadway.

21. The system of claim 16 further comprising at least one warning indicator device within said second vehicle wherein said second warning message signal triggers said at least one warning indicator device to activate within said second vehicle such that a driver of said second vehicle is warned.

22. The system of claim 16 further comprising at least one warning indicator device on an outside of said second vehicle wherein said second warning message signal triggers at least one warning indicator device to activate on said outside of said second vehicle such that other drivers on said roadway in proximity to said second vehicle are warned.

23. The system of claim 1 wherein said re-transmitted information is wirelessly re-transmitted from said roadside repeater station to said remote central tracking station.

24. The system of claim 1 wherein said re-transmitted information is transferred from said roadside repeater station to said remote central tracking station over a wired network.

25. The system of claim 1 wherein said encoded RFID tag information comprises physical geographic position information.

26. The system of claim 1 wherein said encoded RFID tag information comprises global positioning system (GPS) coordinates.

27. The system of claim 1 wherein said encoded RFID tag information comprises an RFID tag identification code.

28. The system of claim 1 wherein said first RFID scanner includes an antenna that is mounted to a front portion of said first vehicle.

29. The system of claim 1 wherein said first RFID scanner includes an antenna that is mounted to a back portion of said first vehicle.

30. The system of claim 1 wherein said first RFID scanner includes an antenna that is mounted to a bottom portion of said first vehicle.

31. The system of claim 1 wherein said RFID tags are affixed substantially in the center of individual lanes on a surface of said roadway.

32. The system of claim 1 wherein said first transceiver also transmits a first vehicle identification code corresponding to said first vehicle as part of said first RF signal.

33. The system of claim 1 wherein said first transceiver also transmits time stamp information as part of said first RF signal.

34. The system of claim 1 further comprising a first driver's license reader device operatively connected to said first transceiver to read a driver identification code on a driver's license that is presented to said first driver's license reader device and to transfer said driver identification code to said first transceiver.

35. The system of claim 34 wherein said first transceiver encodes said driver identification code into said first RF signal.

36. The system of claim 35 wherein said central tracking station determines a status of said driver's license and notifies the authorities if said status of said driver's license is that of being suspended.

37. The system of claim 1 wherein said central tracking station tracks a current roadway location of said first vehicle using at least said received RFID tag information transmitted from said first vehicle.

38. The system of claim 1 wherein said central tracking station estimates a current speed of said first vehicle using at least said received RFID tag information transmitted from said first vehicle.

39. The system of claim 1 wherein said central tracking station and said at least one database store and correlate information, including vehicle identification codes, driver identification codes, RF tag location information, and driver ranking information.

40. The system of claim 39 wherein said driver ranking information includes at least one of hours allowed to drive, lanes allowed to drive in, speed allowed to drive at, and type of vehicle allowed to drive, for each driver identification code stored in said at least one database.

41. The system of claim 39 wherein said driver ranking information, for any driver identified in said at least one database by one of said driver identification codes, is determined based on at least one of a driving record of said driver, an age of said driver, a vehicle of said driver, a test taken by said driver, and a criminal record of said driver.

42. The system of claim 1 wherein said central tracking station transmits a first warning message signal, either directly or indirectly, to said first transceiver of said first vehicle.

43. The system of claim 42 wherein said first warning message signal indicates that said first vehicle is traveling in a lane of said roadway in which said first vehicle and/or a driver of said first vehicle is not authorized to travel.

44. The system of claim 42 wherein said first warning message signal indicates that said first vehicle is traveling on said roadway at a time of day for which said first vehicle and/or a driver of said first vehicle is not authorized to travel on said roadway.

45. The system of claim 42 wherein said first warning message signal indicates that said first vehicle is traveling on said roadway at an unauthorized speed.

46. The system of claim 42 wherein said first warning message signal indicates that a driver of said first vehicle is not authorized to drive said first vehicle on said roadway.

47. The system of claim 42 further comprising at least one warning indicator device within said first vehicle wherein said first warning message signal triggers said at least one warning indicator device to activate within said first vehicle such that a driver of said first vehicle is warned.

48. The system of claim 42 further comprising at least one warning indicator device on an outside of said first vehicle wherein said first warning message signal triggers said at least one warning indicator device to activate on said outside of said first vehicle such that other drivers on said roadway in proximity to said first vehicle are warned.

49. The system of claim 1 wherein said remote central tracking station is capable of tracking a plurality of other vehicles on said roadway, wherein each of said other vehicles has installed an RFID scanner that is operatively connected to a transceiver which are capable of operating in a similar manner as said first RFID scanner and said first transceiver.

50. The system of claim 49 wherein said remote central tracking station is capable of generating traffic flow data in response to tracking said first vehicle and said plurality of other vehicles on said roadway.

51. The system of claim 50 wherein said remote central tracking station is capable of changing the operation of at least one traffic control device associated with said roadway in response to said traffic flow data.

52. The system of claim 1 wherein said RFID tags are affixed substantially off-center in individual lanes on a surface of said roadway.

* * * * *